Dec. 4, 1934.  L. LACHER ET AL  1,983,296
ARRANGEMENT IN MULTICELL ELECTROLYZERS
Filed July 23, 1932  2 Sheets-Sheet 1
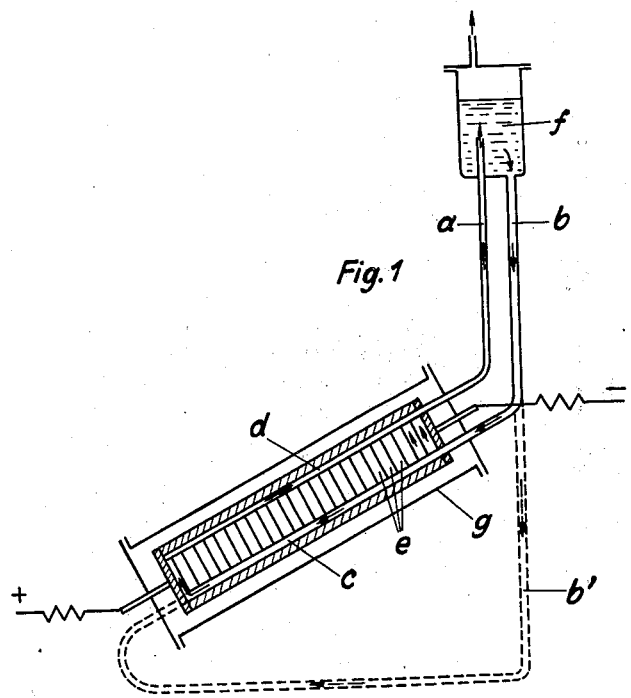
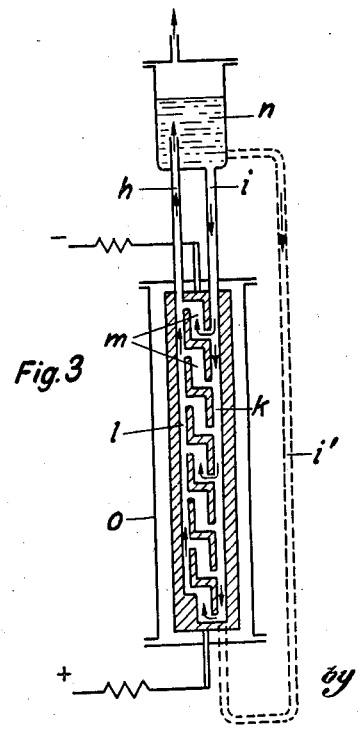
Inventors:
Ludwig Lacher and
Hans Niederreither,

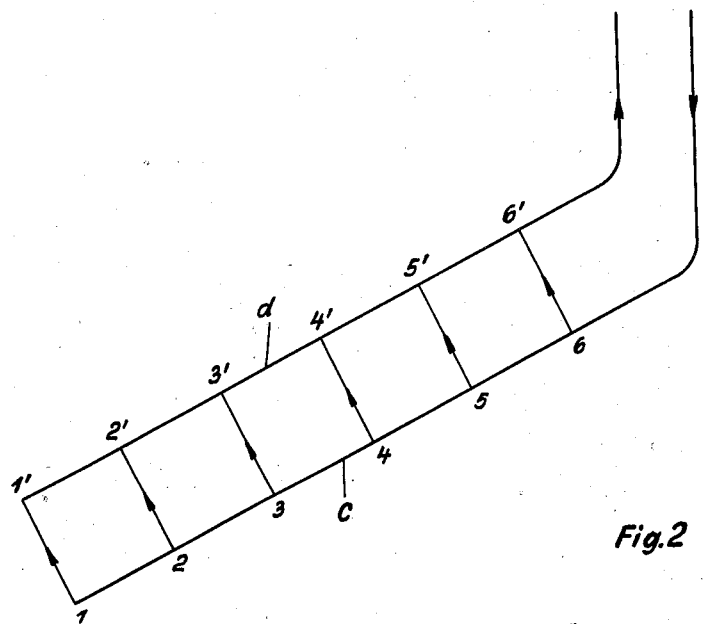
Fig.2
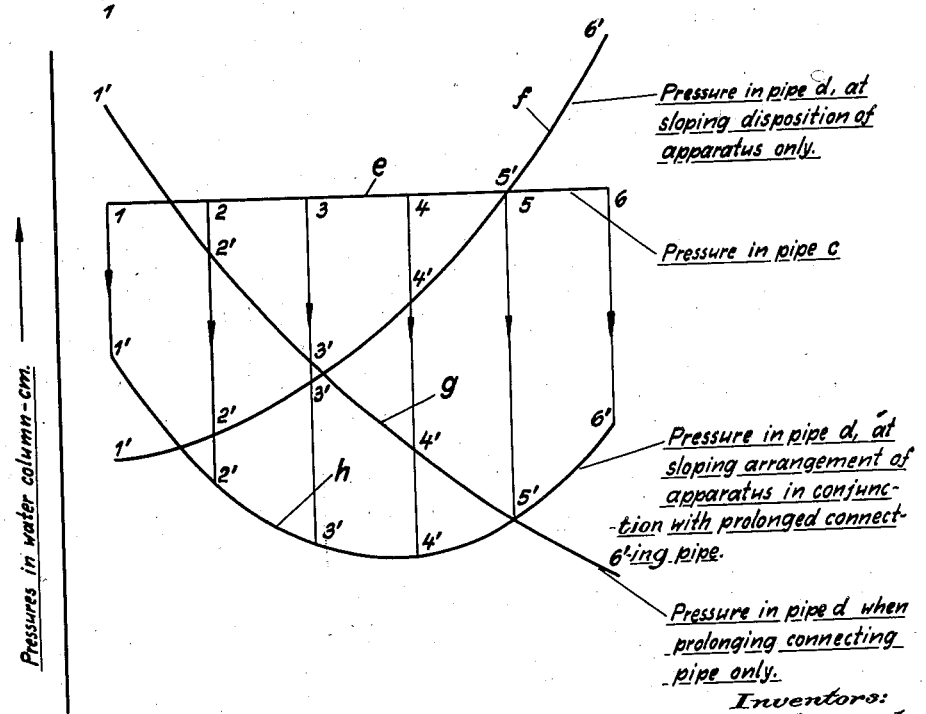

UNITED STATES PATENT OFFICE 1,983,296

ARRANGEMENT IN MULTICELL ELECTROLYZERS

Ludwig Lacher and Hans Niederreither, Munich, Germany, assignors to the firm Lawaczeck Gesellschaft mit beschrankter Haftung in Liquidation, Berlin, Germany Application July 23, 1932, Serial No. 624,260
In Germany August 28, 1931

7 Claims. (Cl. 204—5)

This invention relates to multi-cell electrolyzers, and in particular pressure electrolyzers in which means are provided for uniformly rinsing the individual cells.

Electrolyzers, in which a plurality of cells is assembled as one unit and some or all of the cells are provided with common electrolyte circulation show the defect that after a longer or shorter period of operation considerable corrosion is experienced on certain cells. This circumstance, apart from the contamination of the gas and the lowering of the efficiency, makes it necessary to frequently replace some of the cells. For example, in the well known filter press system, which is extensively used for the decomposition of water and in which every cell is included in the common circulation, the back cells, that is to say those which are farthest from where the gas collecting ducts open into the gas separation vessel, are frequently destroyed. In the known vertical decomposition apparatus, in which for example all superposed cells or a plurality thereof are connected by an electrolyte circulation common to them, such corrosion is experienced in the top cells.

Applicants have now ascertained that the cause of this strong corrosion lies chiefly in the accumulation of gas which occurs in the usual arrangement of electrolyte circulation and the consequent denudation from electrolyte of the electrode surfaces at the subsequent passage of current by the absence of electrolyte.

The object of the invention is therefore to remedy these defects by providing uniform conditions of operation for every cell, by means of a novel arrangement for electrolyte circulation.

The arrangement according to the invention for the uniform rinsing of the cells disposed in a row in the longitudinal axis of multicellular electrolyzers, especially pressure electrolyzers, and connected to common circulation passages for the electrolyte within the said battery, and having a separation vessel arranged above the cell battery, is characterized in that the vertex of the electrolyte circulation passages is disposed at such height above the cell battery and that its connecting passages with the cell battery and the cells are so dimensioned that an ample circulation velocity for the electrolyte is obtained in order to assure the effective participation in the electrolyte circulation of the cells lying nearer to or more removed from the vertex.

For this purpose it is of particular advantage to dispose the electrodes at right angles to the longitudinal axis of the decomposing apparatus.

In order to solve the problem, the decomposing unit, for instance in the filter press system, is disposed according to the invention not horizontally or with a slight slope, as before, but slantingly to such an extent that its longitudinal axis will form with the horizontal an angle of at least 5°, the said angle preferably lying between 10° and 90°. The best results were obtained when the angle was between 20 and 45°, but the battery of cells, or its longitudinal axis may be disposed, in certain cases, vertically.

It has proved to be of advantage if the length of the connecting passages between the cell battery and the vertex of the electrolyte circulation passages is at least half as long or as long as the length of the cell battery. Preferably, the connecting passages may even be longer than the cell battery.

It has been found that in spite of the diaphragms being disposed slantingly in decomposition apparatus of the type described, however surprising this may be, the gases are not of poorer quality, but rather somewhat improved as compared to the gases produced by a decomposition apparatus disposed horizontally as usual.

The slanting arrangement results in the friction resistance of the electrolyte and the electrolyte gas mixture in the slopingly rising passages being partially compensated, or even overcome in case of a suitable slope, by the upward driving force of the gas and electrolyte mixture, which is now also acting in the said passages. In the case of electrolyzers of the filter press type, for example, no accumulation of gas or disturbance in the circulation will take place in the back cells but if the slope of the electrolyzer is suitable, the electrolyte stream will flow with the same velocity in the said back cells as in the front ones. The most suitable slope in each particular case can be specially determined for each plant by well known means, since the slope is naturally dependent on the relation of the driving force to the resistance of the electrolyte circulation. As is well known, the resistance to the circulation of electrolytes and of the electrolyte gas mixture are dependent on the temperature, viscosity, and velocity of circulation of the electrolyte, the roughness of the passage walls, the cross sectional areas and lengths of the passages and circulation conduits and on the design of the cells. The driving force produced in the slantingly disposed gas-electrolyte passage must, by suitably adjusting the slope of the electrolyzer be made at least great enough to be sufficient for rinsing the weakest cells. The most suitable slope is the one with which the velocity of circulation is approximately the same in every cell.

In vertically disposed decomposing apparatus, in which for instance all superposed cells, or a plurality thereof, are connected by common electrolyte circulation, uniform operating conditions for all the cells can be obtained through a suitable electrolyte circulation by the provision of electrolyte circulation conduits, the ascension tubes of which are disposed on the upper cells. By this means the electrolyte in the upper cells can be given approximately the same driving force for the circulation as that in the intermediate or lower cells.

In the case of electrolyzers in which different volumes of gas are produced on the cathode and on the anode side, as is the case for example when decomposing water, the operating conditions on the catholyte and anolyte side are inherently different due to the different volumes of gas which have to be led off, even if the arrangement according to the invention is utilized for the circulation of the electrolyte. In order now further to render the operating conditions uniform on these two sides as well, in such a manner that no difference of pressure should be experienced on the two sides of the diaphragm, according to the invention the cross sectional areas of the ascending tubes in which the gas electrolyte mixture circulates are made of different sizes, so that the same flow conditions are obtained for the cathode and anode sides.

If, for instance, in a water electrolyzer, the cross sectional areas of the hydrogen and oxygen cells are the same, approximately the same quantity of electrolyte must be supplied to the oxygen side as to the hydrogen side in order to establish the same conditions of flow and therewith the same pressures on both sides of the diaphragm, although only half as much oxygen gas is produced. This result can be obtained in accordance with the above rule either by increasing the cross sectional area of the ascending conduits through which the electrolyte oxygen gas mixture is passing, or by reducing the cross sectional area of the corresponding conduits on the hydrogen side.

By employing these means it becomes possible to establish similar conditions of flow, and therewith similar operating conditions in every cell, including the anode and cathode cells.

The advantage obtained in this way is very great. First of all, as already mentioned in the introduction, the life of the apparatus is prolonged. It now only depends on the chemical resistance of the materials employed and on the purely physical process of erosion caused by the flowing electrolytes, but no longer on abnormally high temperatures, local enrichments of electrolyte concentration, differences of pressure and the denudation of electrode surfaces from electrolyte. In addition, the electrical efficiency of the plant is increased because every cell is now operating with uniformly low voltage. The apparatus can be overloaded to a much greater extent, as the limit load is no longer determined by individual inefficient cells. Purer gases are obtained, and thus the safety of operation is increased. Furthermore, due to the space being better utilized, savings can be effected in material, because the hitherto usual and necessary gas-tight packing of the upper part of the diaphragm becomes superfluous, and these surfaces, moreover, become available as working surfaces. The electrolyzers can be so constructed as to form considerably longer, and therewith cheaper, units.

The application of the invention to pressure electrolyzers is, however, especially valuable. All of its advantages become more pronounced, and the increase of the safety of operation is here of deciding advantage. The costs of the pressure vessels are reduced due to the better utilization of space and especially to the possibility of employing longer decomposer units in accordance with the invention, because long tubes, calculated per kilowatt of built-in decomposing apparatus, are much cheaper than short tubes.

Above all, however, the corrosion, which is much stronger at a higher pressure, is reduced to a minimum. Hitherto the accumulation of gas was especially destructive in the case of pressure decomposers, because such was accompanied by corrosion many times as great as that experienced in the case of atmospheric electrolysis. In addition, for example in case of water electrolysis under high pressure, the distilled water which has to be continuously added to replace the quantities used up in the electrochemical process, is now uniformly supplied to every cell, which is of special importance as in pressure decomposers the quantity of electrolyte is very small as compared to the performance, so that if the distribution of feed water is not uniform, a very low concentration will be obtained in one cell and a very high one in another. The formation of such local increase or decrease of concentration has a deteriorating effect on the tension (increase of tension) and the resistance capacity of the materials. Only through the application of the invention is it possible fully to utilize the possibility of imposing high loads, given by the high pressures, on pressure electrolyzers. In consequence of local temperature increase and the fact that some of the cells were out of service, this result could not be obtained up to now. Since the economical load limit is very much higher in high pressure electrolyzers than in the low pressure ones due to the flatter voltage characteristics, the increase of the load limit is of very great value here.

In the accompanying drawings two forms of the arrangement according to the invention are diagrammatically shown by way of example.

Fig. 1 shows the first form and

Fig. 2 is a diagram relating thereto.

Fig. 3 shows the second form.

Fig. 1 represents a multi-cell decomposer with common electrolyte circulation for all cells. The decomposer unit forms an angle of 27° with the horizontal. The electrodes are disposed at right angles to the longitudinal axis of the decomposer unit and are contained in the individual cell chambers $e$. The mixture of gas and electrolyte rises from the cells $e$ into the collecting tube $d$ and from there into the ascension tube $a$. The electrolyte flows through the return pipe $b$ (or $b'$ as well) into the distribution pipe $c$, and hence into the individual cells $e$. The gas is separated in the separation vessel $f$.

In the diagram according to Fig. 2 the effect obtained through the cooperation of the sloping arrangement, and the special arrangement of the electrolyte circulation is shown by means of curves.

The straight line $e$, indicates the course of the pressure in the electrolyte distribution pipe $c$, the points where this pipe opens into the individual cells are indicated by the numerals 1 to 6.

The curve $f$ shows the course of the pressure in the gas collecting pipe $d$, when the prolonged connecting lines are nonexistent. The difference in the pressures is obtained from the course followed by the curves $e$ and $f$.

It will be apparent from the illustration of the curves that when operating without prolonged connecting lines the cells 1, 2, 3 and 4 will be traversed in the direction of the gas and that no electrolyte will flow in the cell 5, because the pressures at the inlet and outlet are the same, while the cell 6 shows an electrolyte flow from 6' to 6, that is to say in the reverse direction.

The course of the pressure in the gas collecting tube $d$, which is obtained by the prolonged connecting lines alone, assuming that the decomposer is arranged horizontally, is indicated by the curve $g$. The difference of pressures at the individual cell inlets and outlets, as will be seen from the formation of the curve, is such that only the cells 2 to 6 are traversed by the electrolyte in the proper direction. It is therefore apparent that even by the application of the prolonged connecting lines alone, the desired circulation cannot be obtained.

Finally, the curve $h$ indicates how the pressure is developed in the gas collecting tube $d$ when the slantingly disposed decomposer is provided with prolonged connecting lines. This curve is obtained by adding together the curves $f$ and $g$ and it gives a true picture of the course of the pressure when the arrangement according to the invention is adopted.

It can be seen from a comparison of the curves $e$ and $h$ that all cells 1 to 6 are traversed in the proper direction by the lye. This can only be obtained by the slanting arrangement in conjunction with the prolonged connecting lines.

Fig. 3 shows a multi-cell decomposer of vertical disposition, in which the electrolyte circulation is common to all the cells. The electrodes are arranged parallel to the longitudinal axis and the individual cells are superposed. The longitudinal axis forms an angle of 90° with the horizontal. The gas produced in the cells $m$ flows into the gas collecting tube $l$ carrying electrolyte with it, and thence is passed through the ascension tube $h$ into the separation vessel $n$. The electrolyte flows through the return tube $i$ (or $i'$) into the distribution pipe $k$ and thence to the cells $m$.

We claim:—

1. Gas-producing electrolyzing apparatus comprising a battery having a plurality of cells of filter-press type arranged with their electrodes substantially at right angles to a common axis, common internal inlet and outlet conduit means connecting all said cells in multiple for the supplying of electrolyte thereto and for the escape of gas and electrolyte therefrom, said conduit means including distributing and collecting portions close to the cells and extending substantially parallel to said axis, said axis being located at an angle of not less than 5 degrees to the horizontal, external inlet and outlet conduit means communicating with said internal conduit means and extending above the highest point of the battery, and gas separating means connecting said external inlet and outlet conduit means at such a height above the battery that the gas-lift effect of the column of liquid and gas in said internal and external outlet conduit means and the liquid head in said internal and external inlet conduit means maintain a circulation velocity producing a drop of pressure across each cell for assuring an active circulation through all the cells of the battery and preventing the accumulation of gas in any said cell.

2. An apparatus as in claim 1, in which the axis is at an angle of between 10 and 90 degrees to the horizontal.

3. An apparatus as in claim 1, in which the axis of the battery is at an angle between 20 and 45 degrees to the horizontal.

4. Electrolyzing apparatus comprising a battery of cells arranged along a vertical axis, common inlet and outlet conduit means for connecting the cells in multiple, said outlet conduit means permitting the upward flow of electrolyte and gas therein, and gas separating means connected to said conduit means at such a height above the battery that the column of liquid in the inlet conduit means below the vertex of circulation through said conduit and separating means and cells and the column of liquid and gas in said outlet conduit means below the vertex maintain a sufficient circulation velocity to assure an active circulation through all the cells of the battery.

5. Electrolyzing apparatus comprising a battery of cells having their electrodes arranged transversely to an axis located at an angle of not less than 5 degrees to the horizontal, common inlet and outlet conduit means for connecting the cells in multiple and extending above the battery, and gas separating means connected to the said conduit means at a distance from one-half as long as to the same length as the battery to provide a vertex of circulation so that the column of liquid in the inlet conduit means below the vertex of circulation through said conduit and separating means and cells, and the column of liquid and gas in said outlet conduit means below the vertex, maintain a sufficient circulation velocity to assure an active circulation through all the cells of the battery.

6. Electrolyzing apparatus comprising a battery of cells having their electrodes arranged transversely to an axis located at an angle of not less than 5 degrees to the horizontal, common inlet and outlet conduit means for connecting the cells in multiple and extending above the battery, and gas separating means connected to the said conduit means at a distance above the battery longer than the length of the battery to provide a vertex of circulation so that the column of liquid in the inlet conduit means below the vertex of circulation through said conduit and separating means and cells and the column of liquid and gas in said outlet conduit means below the vertex maintain a sufficient circulation velocity to assure an active circulation through all the cells of the battery.

7. Electrolyzing apparatus for producing gas by electrolysis, in which the gas volumes on the cathode and anode sides differ, comprising a battery of cells arranged along an axis at an angle of not less than 5 degrees to the horizontal, a common inlet conduit for connecting the cells in multiple, separate outlet conduits for the gases and having differing cross-sectional areas whereby the conditions of flow in said outlet conduits are compensated, and gas separating means connected to said outlet conduits and said inlet conduit at such a height above the battery that the liquid columns below the vertex of circulation maintain a sufficient circulation velocity to insure an active circulation of velocity through all the cells.

LUDWIG LACHER.
HANS NIEDERREITHER.